Oct. 28, 1941. A. H. VRANICHAR 2,260,875
CAR SERVER
Filed May 3, 1939
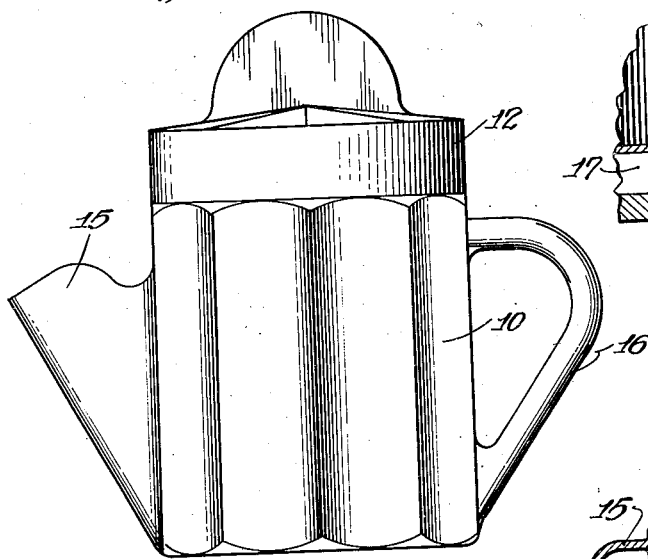
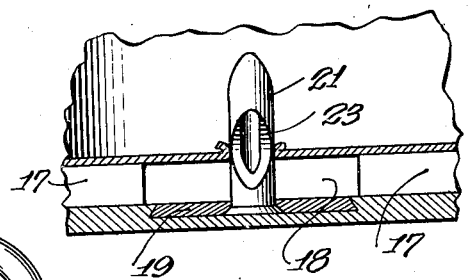
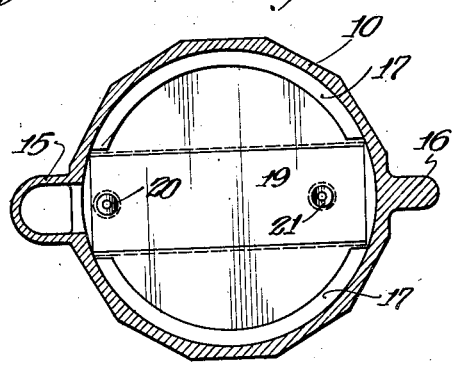
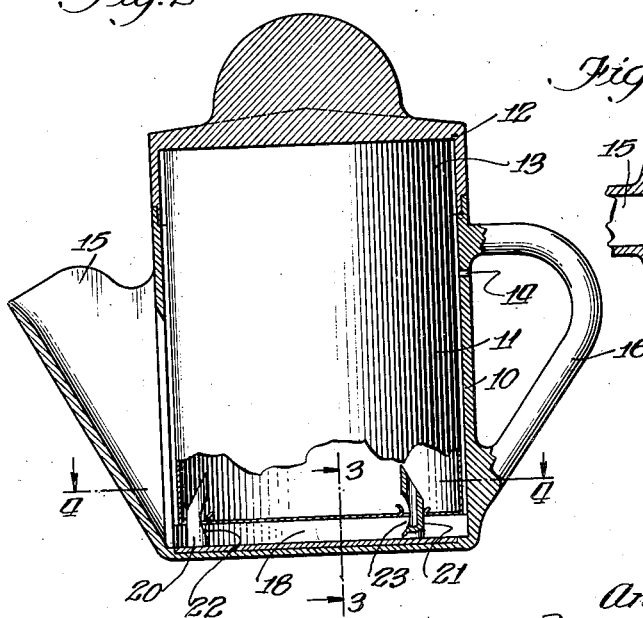
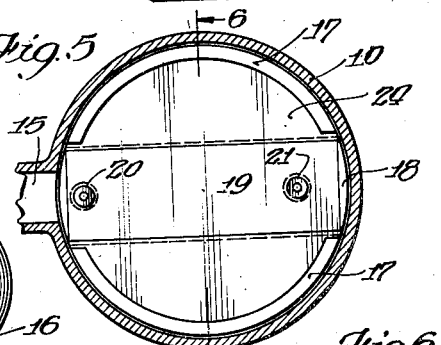
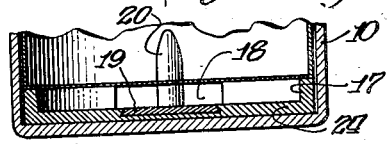
Inventor:
Anthony H. Vranichar
By: Brayton Richards
Attorney.

Patented Oct. 28, 1941

2,260,875

UNITED STATES PATENT OFFICE 2,260,875

CAN SERVER

Anthony H. Vranichar, Joliet, Ill.

Application May 3, 1939, Serial No. 271,443

2 Claims. (Cl. 65—61)

The invention relates to improvements in can servers especially adapted for serving canned milk or other canned liquids, the primary object being the provision of a server of the character indicated which is of simple construction and highly efficient in use.

Other objects will appear hereinafter.

The invention consists in the combinations and arrangements of parts hereinafter described and claimed.

The invention will be best understood by reference to the accompanying drawing forming a part of this specification and in which Fig. 1 is a side view of a server embodying the invention;

Fig. 2 a vertical transverse section of the same;

Fig. 3 an enlarged vertical detail section taken substantially on line 3—3 of Fig. 2;

Fig. 4 a horizontal section taken substantially on line 4—4 of Fig. 2;

Fig. 5 a horizontal section of a modified form of construction; and

Fig. 6 a section taken substantially on line 6—6 of Fig. 5.

The embodiment of the invention illustrated in Figs. 1, 2, 3, and 4 of the drawing comprises a container 10 preferably in the form of a pitcher made of molded material and of a size to receive loosely an ordinary can 11 of canned milk or the like. The container 10 is provided with a removable cover 12 and is of materially less height than the can 11 so that the top portion 13 of the can will protrude materially from the container to facilitate manipulations and removal of the can.

The container 10 is provided as shown with an air entry opening 14 on one side and a discharge spout 15 at its opposite side communicating with the bottom thereof. A handle 16 is provided as shown over the air opening 14 to facilitate discharge of liquid from the container through the spout 15.

At its bottom, at each side the container 10 is provided with supporting ledges or shoulders 17 adapted and arranged to support the can with its bottom elevated above the bottom of the container thereby providing a liquid space 17 therein between said ledges which communicates with the bottom of the spout 15 as indicated.

A metallic plate 17 which is preferably of stainless steel is inserted centrally in the bottom of the container traversing the space 18 as indicated. Penetrating prongs 20 and 21 are attached as shown to the plate 19 and are preferably also made of stainless steel. The upper end of each of said prongs is beveled and sharpened as shown so as to readily penetrate the bottom of a can forced downwardly into the container. The prongs 20 and 21 are tubular in form and are provided at their sides with notches 22 and 23 which span the bottom of the can as best shown in Fig. 2, thereby permitting the ready discharge of liquid from the can when the can is tilted toward the spout 15, and the entry of air to the other side of the can to permit the discharge of the liquid from the can. When the container and the can are in upright positions, no liquid will flow from the can, as will be readily understood.

By this arrangement a can server is provided in which the dispensing of the liquid therein is rendered possible by the mere insertion of the can in the server; which will permit of the discharge of the contents of the can; which will preserve the contents of the can from contamination until actually served and which is capable of economical production. The specific form and arrangement of parts disclosed is a simple and effective one for the purpose.

In the embodiment of the invention illustrated in Figs. 5 and 6, a removable false bottom 24 is arranged to be inserted in the container 10, said false bottom carrying the can supporting ledges 17, the plate 19 and the prongs 20 and 21. The operation of the device is precisely the same as that of the device already described, the advantage of this arrangement being that the can penetrating elements may be readily removed for cleansing purposes.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A device of the class described comprising a can container provided with can supporting ledges around the bottom of the sides thereof and a spout leading from the space between said ledges; a can penetrating prong in the form of a tube having its upper end sharpened and also having a notch in its side spanning the bottom of a penetrated can, and positioned in the bottom of the container adjacent said spout and adapted and arranged to permit discharge of liquid from the bottom of a can into said spout; and another can penetrating prong in the form of a tube having its upper end sharpened and also having a notch in its side spanning the bottom of a penetrated can and positioned at a point diametrically opposite said first mentioned prong.

2. A false bottom for a can server comprising a plate insertable in a container, said plate being provided along its side edges with can supporting ledges thereby providing a liquid space between them; and can penetrating prongs carried by said plate and projecting upwardly between said ledges.

ANTHONY H. VRANICHAR.